United States Patent
Li

(10) Patent No.: US 11,523,085 B2
(45) Date of Patent: Dec. 6, 2022

(54) METHOD, SYSTEM, DEVICE FOR VIDEO DATA TRANSMISSION AND PHOTOGRAPHING APPARATUS

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 17/206,466

(22) Filed: Mar. 19, 2021

(65) Prior Publication Data

US 2021/0211607 A1    Jul. 8, 2021

Related U.S. Application Data

(63) Continuation of application No. PCT/CN2019/106726, filed on Sep. 19, 2019.

(30) Foreign Application Priority Data

Sep. 20, 2018  (CN) .......................... 201811101486.2

(51) Int. Cl.
    *H04N 7/01*    (2006.01)

(52) U.S. Cl.
    CPC ......... *H04N 7/0122* (2013.01); *H04N 7/0125* (2013.01); *H04N 7/0127* (2013.01); *B64C 2201/127* (2013.01)

(58) Field of Classification Search
    CPC ...... H04N 7/01; H04N 7/0122; H04N 7/0125; H04N 7/012; H04N 7/0127; B64C 39/024; B64C 2201/123; B64C 2201/127

(Continued)

(56) References Cited

U.S. PATENT DOCUMENTS

2012/0200703 A1    8/2012  Nadir et al.
2012/0300124 A1*  11/2012  Yamashita ........... H04N 7/0125
                                              348/E7.003
2015/0229878 A1*   8/2015  Hwang .......... H04N 21/234381
                                                    348/446

FOREIGN PATENT DOCUMENTS

CN      104219492 A      12/2014
CN      105160636 A      12/2015
               (Continued)

OTHER PUBLICATIONS

The Second Chinese Office Action dated Aug. 11, 2020; Appn. No. 201811101486.2.

(Continued)

*Primary Examiner* — Sherrie Hsia

(57) ABSTRACT

Embodiments of the present invention relate to the field of aerial vehicle technologies, and disclose a method and apparatus for video data transmission, an image transmitting terminal, and an aerial vehicle image transmission system. The method includes: acquiring an original image; converting the original image into a first image, the first image being an image conforming to a format of an audio/video interface; converting the first image into a second image, the second image being an image conforming to a format of an interface of a display apparatus; encoding the second image to obtain encoded video image frames; and transmitting the encoded video image frames to the display apparatus. By means of the image transmission method provided in this embodiment of the present invention, the image is transmitted in real time.

25 Claims, 4 Drawing Sheets

(58) Field of Classification Search
USPC .............. 348/445, 441, 458, 459, 446, 913
See application file for complete search history.

(56) References Cited

FOREIGN PATENT DOCUMENTS

| CN | 105657486 A | 6/2016 |
| CN | 106375720 A | 2/2017 |
| CN | 107005673 A | 8/2017 |
| CN | 107079135 A | 8/2017 |
| CN | 109040840 A | 12/2018 |

OTHER PUBLICATIONS

The International Search Report dated Nov. 26, 2019; PCT/CN2019/106726.

\* cited by examiner

METHOD, SYSTEM, DEVICE FOR VIDEO DATA TRANSMISSION AND PHOTOGRAPHING APPARATUS

CROSS REFERENCE

This application is a continuation of International Application No. PCT/GN2019/106726, filed on Sep. 19, 2019, which claims priority to Chinese Patent Application No. 2018111014862 filed on Sep. 20, 2018, which is incorporated herein by reference in its entirety.

BACKGROUND

Technical Field

Embodiments of the present invention relate to the field of aerial vehicle technologies, and in particular, to a method, a system, a device for video data transmission and a photographing apparatus.

Related Art

With the development of aerial technologies, aerial vehicles such as unmanned aerial vehicles (UAVs) have attracted more attentions. Because the UAV, as a popular photographing vehicle, has features of high maneuverability, fast response and flexible position movement, the UAV may obtain many photographing angles that are impossible for many normal photography, so that the UAV is increasingly applied to aerial photography, surveying and mapping.

For the current application of the UAV in aerial photography, surveying and mapping, generally, aerial photography, surveying and mapping parameters are set before the UAV takes off. After the UAV takes off, an image is obtained by using a photographing apparatus of the UAV, and is stored in a storage space of the UAV, to form a file such as a picture or a video. After the UAV completes a flight task of the aerial photography, surveying and mapping, a user then views the image obtained by using the photographing apparatus from the storage space of the UAV, By means of this manner, whether the image obtained by the UAV in a flight process is overexposed, too dark, in a visual field or the like cannot be determined in real time. If the effect of viewing the image obtained by using the photographing apparatus from the storage space of the UAV cannot meet an expected effect, aerial photography, surveying and mapping parameters of the UAV need to be reset, and the UAV flies once again. This is both inconvenient and wasteful.

Therefore, how to transmit the image obtained by the aerial vehicles such as the UAV to an image receiving terminal such as a user terminal in real time, for the user to view the obtained image in real time, is an urgent problem to be solved.

SUMMARY

To resolve the foregoing technical problem, embodiments of the present invention provide a method and an apparatus for video data transmission, an image transmitting terminal, and an aerial vehicle image transmission system, which can transmit an image in real time.

In the embodiments of the present invention, the following technical solutions are disclosed.

According to a first aspect, the embodiments of the present invention provide a method for video data transmission, including:

acquiring an original image;

converting the original image into a first image, the first image being an image conforming to a format of an audio/video interface;

converting the first image into a second image, the second image being an image conforming to a format of an interface of a display apparatus;

encoding the second image to obtain encoded video image frames; and transmitting the encoded video image frames to the display apparatus.

Optionally, before the encoding the second image to obtain encoded video image frames, the method further includes:

counting a quantity of pixels that meet a preset condition in a preset region of the second image; and detecting whether the quantity falls within a preset range.

The encoding the second image to obtain encoded video image frames includes:

encoding the second image with the quantity being within the preset range to obtain the encoded video image frames.

Optionally, the preset condition is that an image grayscale value of a pixel is less than a preset grayscale threshold.

Optionally, the method further includes:

discarding the second image with the quantity being not within the preset range.

Optionally, the discarding a second image with the quantity is not within the preset range includes:

discarding a full back screen image, the full back screen image being a second image with the quantity being greater than a first preset quantity threshold when the preset region is an entire region of the second image, the first preset quantity threshold being determined by a size and a first preset dead pixel tolerance quantity of the second image.

Optionally, the discarding a second image with the quantity is not within the preset range further includes:

discarding, when an adjacent frame image of an image with symmetrical black bars is a full back screen image, the image with symmetrical black bars, the image with symmetrical black bars being a second image with the quantity being greater than a second preset quantity threshold when the preset region is a partial region of the second image, the partial region including a first region and a second region, the first region and the second region being symmetrically distributed, and the second preset quantity threshold being determined by sizes and a second preset dead pixel tolerance quantities of the first region and the second region.

Optionally, before the converting the original image into a first image, the method further includes:

compressing the original image according to a preset ratio, to obtain a compressed image.

The converting the original image into a first image includes:

converting the compressed image into the first image.

Optionally, the method further includes: storing the original image.

Optionally, the audio/video interface includes one or more of the following: a High-Definition Multimedia Interface (HDMI) interface, a Video Graphics Array (VGA) interface, a Digital Visual Interface (DVI), and a DisplayPort (DP) interface.

Optionally, the interface of the display apparatus includes one or more of the following: a BT1120 interface, a BT656 interface, and a BT709 interface.

According to a second aspect, the embodiments of the present invention provide an image transmission apparatus, including:

an acquisition module, configured to acquire an original image;

a first conversion module, configured to convert the original image into a first image, the first image being an image conforming to a format of an audio/video interface;

a second conversion module, configured to convert the first image into a second image, the second image being an image conforming to a format of an interface of a display apparatus;

an encoding module, configured to encode the second image to obtain encoded video image frames; and a transmission module, configured to transmit the encoded video image frames to the display apparatus.

Optionally, the apparatus further includes:

a counting module, configured to count a quantity of pixels that meet a preset condition in a preset region of the second image; and a detection module, configured to detect whether the quantity s within a preset range.

The encoding module is specifically configured to:

encode a second image with the quantity being within the preset range to obtain encoded video image frames.

Optionally, the preset condition is that an image grayscale value of a pixel is less than a preset grayscale threshold.

Optionally, the apparatus further includes:

a discarding module, configured to discard the second image with the quantity being not within the preset range.

Optionally, the discarding module is specifically configured to:

discard a full back screen image, the full back screen image being a second image with the quantity being greater than a first preset quantity threshold when the preset region is an entire region of the second image, the first preset quantity threshold being determined by a size and a first preset dead pixel tolerance quantity of the second image.

Optionally, the discarding module is specifically configured to:

discard, when an adjacent frame image of an image with symmetrical black bars is a full back screen image, the image with symmetrical black bars, the image with symmetrical black bars being a second image with the quantity being greater than a second preset quantity threshold when the preset region is a partial region of the second image, the partial region including a first region and a second region, the first region and the second region being symmetrically distributed, and the second preset quantity threshold being determined by sizes and second preset dead pixel tolerance quantities of the first region and the second region.

Optionally, the apparatus further includes:

a compression module, configured to compress the original image according to a preset ratio, to obtain a compressed image.

The first conversion module is specifically configured to:

convert the compressed image into the first image.

Optionally, the apparatus further includes: a storage module, configured to store the original image into a storage space.

According to a third aspect, the embodiments of the present invention provide an image transmitting terminal, including:

at least one processor; and a memory communicatively connected to the at least one processor, where the memory storing instructions executable by the at least one processor, the instructions being executed by the at least one processor, to cause the at least one processor to be capable of performing the image transmission method described above.

According to the fourth aspect, the embodiments of the present invention further provide a computer program product, including a computer program stored in a non-volatile computer-readable storage medium, the computer program including program instructions, the program instructions, when executed by a computer, causing the computer to perform the image transmission method described above.

According to a fifth aspect, the embodiments of the present invention further provide a non-volatile computer-readable storage medium, the computer-readable storage medium storing computer executable instructions, the computer executable instructions being configured to cause a computer to perform the image transmission method described above.

According to a sixth aspect, the embodiments of the present invention further provide an aerial vehicle image transmission system, including: an image transmitting terminal and an image receiving terminal, the image transmitting terminal being communicatively connected to the image receiving terminal; and the image transmitting terminal being the image transmitting terminal described above.

In the image transmission method according to the embodiments of the present invention, an acquired original image is first converted into a first image conforming to a format of an audio/video interface, the first image is then converted into a second image conforming to a format of an interface of an image receiving terminal, the second image is encoded to obtain encoded video image frames, and the encoded video image frames are finally transmitted to an image receiving terminal, thereby achieving real-time image transmission, allowing a user to view the acquired image in real time.

In addition, in the image transmission method according to the embodiments of the present invention, a second image that is a full back screen image or an image with symmetrical black bars is discarded by detecting whether a quantity of pixels that meet a preset condition in a preset region of the second image falls within the preset range, thereby optimizing the visual effect of the image received by the image receiving terminal.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary Skill in the art based on the embodiments of the present invention without creative efforts shall fall within the protection scope of the present invention.

In addition, technical features involved in implementations of the present invention that are described below may be combined with each other provided that no conflict occurs.

Figure 1:
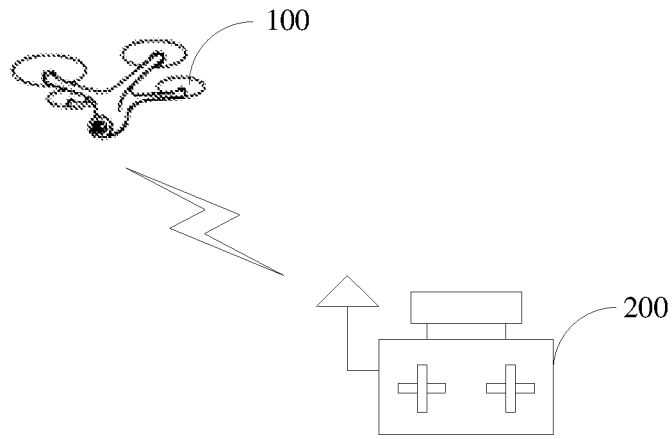
FIG. 1 is a schematic diagram of an application environment of a method for video data transmission according to an embodiment of the present invention.

FIG. 1 shows one of application environments of a method for video data transmission according to an embodiment of the present invention. As shown in FIG. 1, the application environment includes an unmanned aerial vehicle (UAV) 100, an image receiving terminal 200 and a user (not shown). The UAV 100 is communicatively connected to the image receiving terminal 200, to exchange information. The user may know an image acquired by the UAV 100 by using the image receiving terminal 200.

The UAV 100 may be an aerial vehicle or another movable device driven by any type of power, and includes, but not limited to, a multi-rotor UAV, for example, a quadrotor UAV, a fixed-wing UAV and a helicopter. In this embodiment, the quadrotor UAV is used as an example for description.

The UAV 100 may have a corresponding volume or power according to actual requirements, so as to provide sufficient loading capacity, flight speed, flight mileage, and the like.

Figure 2:
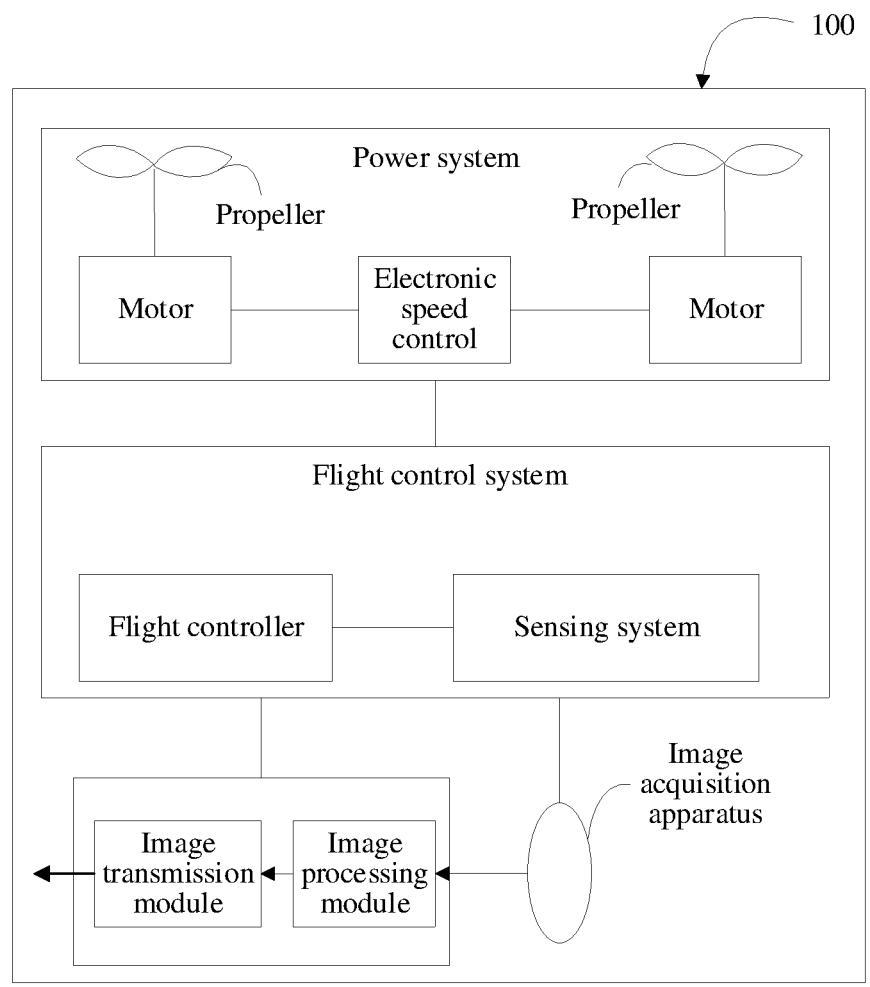
FIG. 2 is a schematic architectural diagram of an unmanned aerial vehicle (UAV) according to an embodiment of the present invention.

For example, as shown in FIG. 2, the UAV 100 at least has a power system configured to provide flight power and a flight control system configured to control the flight of the UAV 100. The flight control system is communicatively connected to the power system.

The power system may include an electronic speed control (referred to as an ESC for short), one or more propellers and one or more motors corresponding to the one or more propellers. The motor is connected between the ESC and the propeller, and the motor and the propeller are disposed on a corresponding arm of the UAV 100.

The ESC is configured to receive a driving signal generated by the flight control system and to provide a driving current to the motor according to the driving signal, to control a rotational speed of the motor. The motor is configured to drive the propeller to rotate, so as to provide power for the flight of the UAV 100, and the power enables the UAV 100 to move with one or more degrees of freedom.

In some embodiments, the UAV 100 may rotate around one or more rotation axes. For example, the foregoing rotation axis may include a roll axis, a translation axis and a pitch axis. It can be understood that, the motor may be a direct current (PC) motor or an alternating current (AC) motor. In addition, the motor may be a brushless motor or a brushed motor.

The flight control system may include a flight controller and a sensing system. The sensing system is configured to measure attitude information of the UAV 100, that is, position information and state information of the UAV 100 in space, for example, a three-dimensional position, a three-dimensional angle, a three-dimensional velocity, a three-dimensional acceleration and a three-dimensional angular velocity. The sensing system may include, for example, at least one of sensors such as a gyroscope, an electronic compass, an inertial measurement unit (IMU), a vision sensor, a Global Navigation Satellite System (GNSS) and a barometer. For example, the GNSS may be a Global Positioning System (GPS).

The flight controller is configured to control the flight of the UAV 100. For example, the flight controller may control the flight of the UAV 100 according to the attitude information measured by the sensing system. It can be understood that, the flight controller may control the flight of the UAV 100 according to a pre-programmed program instruction, or may control the flight of the UAV 100 in response to one or more control instructions from other devices.

In addition, one or more functional modules may be further added to the UAV 100, to enable the UAV 100 to implement more functions, for example, aerial photography, surveying and mapping.

For example, in some embodiments, the UAV 100 at least has an image acquisition apparatus configured to acquire an image, and an original image is acquired by using the image acquisition apparatus. In some other embodiments, the UAV 100 may further provide a fixing support configured for fixedly mounting the image acquisition apparatus, so as to a enable user to change the image acquisition apparatus mounted on the UAV 100 as required.

In some embodiments, the UAV 100 may further include a storage space. The storage space is used for storing the original image, so that the original image may be invoked subsequently when needed. The storage space may be a built-in or external storage space of the UAV 100. For example, the UAV 100 is provided with an external SD card interface, and a memory device such as an SD card may be inserted into the interface, to store the acquired original image. In addition, several frames of consecutive original images form a video. In some examples, the video formed by the several frames of consecutive original images may be alternatively stored in the built-in or external storage space of the UAV 100.

In addition, the UAV 100 at least further has an image processing module and an image transmission module. The image processing module is configured to process the original image acquired by the image acquisition apparatus and to send the processed image to the image receiving terminal 200 by using the image transmission module, thereby achieving real-time image transmission.

In some embodiments, the image acquisition apparatus, the image processing module and the image transmission module may all be integrated in a component of the UAV 100, for example, a camera assembly of the UAV 100. The camera assembly may be used as the image transmitting terminal, to transmit the acquired image to the image receiving terminal 200 in real time by using the image transmitting terminal.

The image receiving terminal 200 may be a user interaction device of any type. The image receiving terminal 200 may be equipped with one or more types of different user interaction devices configured to acquire a user instruction or to present or to feed back information to the user.

The interaction devices include, but not limited to, a button, a display screen, a touchscreen, a speaker and a remote control joystick. For example, the image receiving terminal 200 may be equipped with a touch display screen, and receive a touch instruction of the user through the touch display screen and present information, for example, present an image, to the user through the touch display screen.

In some embodiments, the image receiving terminal 200 may be a smart terminal device such as a mobile phone, a tablet computer, a personal computer or a wearable device. The image receiving terminal 200 may be mounted with a software APP matching the UAV 100.

The user may display, through the software APP, the received image transmitted by the UAV 100 on the touch display screen.

In some other embodiments, the image receiving terminal 200 may be further a dedicated control device matching the UAV 100, for example, a remote control of the UAV 100. The image receiving terminal may receive an image from the UAV 100 and display the image through a built-in or externally-connected display screen.

It can be understood that, the foregoing named components of the UAV 100 are only for identification purposes, and should not be understood as a limitation to the embodiments of the present invention. In addition, the image transmission method according to the embodiments of the present invention may be further extended to other suitable application environments, and are not limited to the application environment shown in FIG. 1. During actual application, the application environment may further include more image receiving terminals.

Embodiment 1

Figure 3:
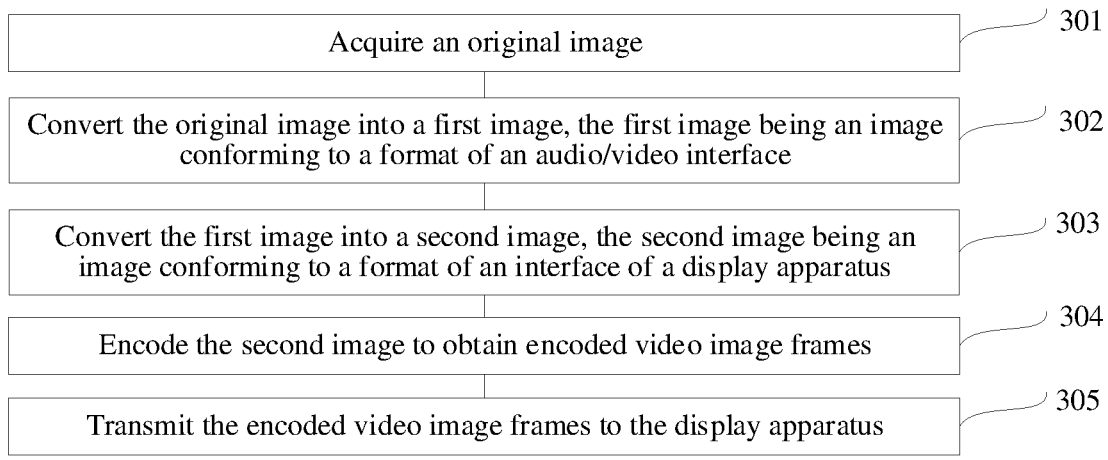
FIG. 3 is a schematic flowchart of a method for video data transmission according to an embodiment of the present invention.

FIG. 3 is a schematic flowchart of a method for video data transmission according to an embodiment of the present invention. The image transmission method in this embodiment of the present invention may be cooperatively performed by the components in the foregoing UAV. This is not limited herein.

Referring to FIG. 3, the image transmission method includes the following steps:

301. Acquire an original image.

During the flight of the UAV, the original image may be acquired by using the image acquisition apparatus, to obtain the original image. The image acquisition apparatus may be an image acquisition device such as a camera and a video camera. In addition, to improve the quality of the acquired original image, a camera with a larger image sensor size, for example, a full-frame camera or a medium format camera, may be adopted, to obtain an original image with higher image quality such as a full-frame image or medium format image.

302. Convert the original image into a first image, the first image being an image conforming to a format of an audio/video interface.

After the original image is acquired, the original image is converted into the first image, to facilitate an output of the original image. For example, the acquired original image is converted into the image conforming to the format of an audio/video interface, to facilitate in outputting to the image processing module for subsequent processing.

The audio/video interface includes, but not limited to, one or more of the following: a High-Definition Multimedia Interface (HDMI) interface, a Video Graphics Array (VGA) interface, a Digital Visual Interface (DVI), and a DisplayPort (DP) interface.

Because the first image is the image conforming to the format of an audio/video interface, the first image is outputted through the audio/video interface such as the HDMI, the VGA interface, the DVI or the DP interface after the original image is converted into the first image.

In some embodiments, because the several frames of consecutive original images may form a video, the video may be alternatively converted into a video conforming to the format of an audio/video interface, and is outputted through the audio/video interface such as the HDMI, the VGA interface, the DVI or the DP interface, to facilitate in transmitting the video in real time.

303. Convert the first image into a second image, the second image being an image conforming to a format of an interface of a display apparatus.

Generally, because the image receiving terminal cannot directly receive the image outputted through the audio/video interface such as the HDMI, the VGA interface, the DVI or the DP interface, to transmit the image in real time, the first image needs to be converted into the second image, so that the image receiving terminal may receive the processed image.

The image processing module of the UAV is configured to process the first image outputted through the audio/video interface such as the VGA interface, the DVI or the DP interface. For example, the image processing module may include a conversion chip, configured to convert the first image into the image, that is, the second image, conforming to the format of an interface of a display apparatus.

The conversion chip may be a Hi3519 chip of Hisilicon or the like. The interface of the display apparatus includes, but not limited to, one or more of the following: a BT1120 interface, a BT656 interface, and a BT709 interface. For example, the Hi3519 chip may convert an image conforming to an HDMI format into an image conforming to a BT1120 format.

304. Encode the second image to obtain encoded video image frames.

The image processing module may further include an encoder, configured to encode the second image. In some embodiments, the functions of converting the first image into the second image and encoding the second image to obtain the encoded video image frames may be further implemented on the same chip. That is, the functions of the conversion chip and the encoder are integrated on the same chip, for example, are integrated on the Hi3519 chip.

A coding standard may be a DivX, XviD, AVC, H.263, H.264, H.265, or Windows Madia. Video standard.

305. Transmit the encoded video image frames to the display apparatus.

The encoded video image frames may be transmitted to the image receiving terminal by using the image transmission module, thereby achieving real-time image transmission. In addition, after the image receiving terminal receives the encoded video image frames, the image receiving terminal may decode the received image by using the decoder, and display the decoded image on a display screen of the image receiving terminal, so that the user may know the acquired image in real time. Therefore, during the flight of the UAV, if cases such as the acquired original image is overexposed, too dark, or in the field of view are encountered, the acquired original image can be adjusted in time, so that the effect of the obtained original image meets an expected effect.

In this embodiment of the present invention, an acquired original image is first converted into a first image conforming to a format of an audio/video interface, the first image is then converted into a second image conforming to a format of an interface of a display apparatus, the second image is encoded to obtain encoded video image frames, and the encoded video image frames are finally transmitted to a display apparatus, thereby achieving real-time image transmission, allowing a user to view the acquired image in real time.

Embodiment 2

Figure 4:
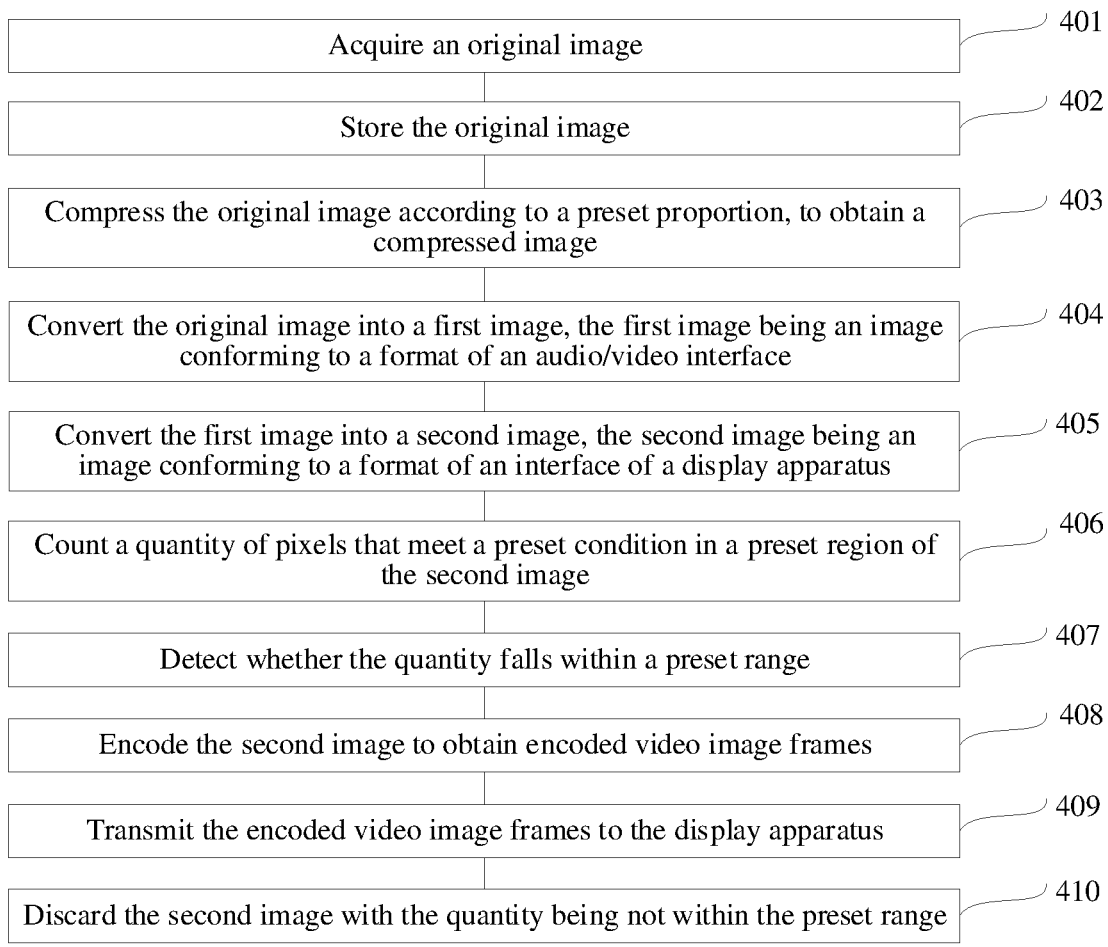
FIG. 4 is a schematic flowchart of another image transmission method according to an embodiment of the present invention.

FIG. 4 is a schematic flowchart of another image transmission method according to an embodiment of the present invention. The image transmission method in this embodiment of the present invention may be cooperatively performed by the components in the foregoing UAV. This is not limited herein.

Referring to FIG. 4, the image transmission method includes the following steps:

401. Acquire an original image.

402. Store the original image.

To subsequently invoke the original image when the original image is needed, the acquired original image may be stored in the built-in or external storage space of the UAV. For example, the UAV is provided with an external SD card interface, and a memory device such as an SD card may be inserted into the interface, to store the acquired original image. In addition, several frames of consecutive original images form a video. In some examples, the video formed by the several frames of consecutive original images may be alternatively stored in the built-in or external storage space of the UAV.

403. Compress the original image according to a preset proportion, to obtain a compressed image.

Generally, to ensure the quality of the image, a resolution of the original image is generally relatively high. For example, the original image may be at a resolution of 40 million pixels, and it is not convenient for such an image at a high resolution to implement real-time image transmission. After the original image is acquired, the original image may be compressed according to the preset ratio, to facilitate subsequent image transmission. For example, the original image at a resolution of 40 million pixels may be reduced to be at 1080P (a resolution of 1920×1080) or 720P (a resolution of 1280×720) or the like.

The preset ratio may be preconfigured in the image acquisition apparatus, or the preset ratio may also be adjusted as required.

404. Convert the original image into a first image, the first image being an image conforming to a format of an audio/video interface.

Based on step 403, the converting the original image into a first image may include: converting the compressed image into the first image.

405. Convert the first image into a second image, the second image being an image conforming to a format of an interface of a display apparatus.

406. Count a quantity of pixels that meet a preset condition in a preset region of the second image.

The partial region of the second image may be an entire region of the second image, or may be a partial region of the second image. The preset condition is that an image grayscale value of a pixel is less than a preset grayscale threshold.

Generally, the image acquisition apparatus is provided with a mechanical shutter. Each time an original image is acquired, the mechanical shutter closes once. In the process of acquiring the original image by the image acquisition apparatus, due to continuous closing of the mechanical shutter, a black screen case of the acquired original image is caused. Because the second image is converted from the first image, and the first image is converted from the original image, a Hack screen case may also occur in the second image, resulting in a case that a black screen image exists in the image transmitted to the display apparatus, thereby affecting the visual effect of the user.

Therefore, to improve the visual effect of the user and avoid the black screen case, the black screen case needs to be processed before the second image is encoded to obtain the encoded video image frames.

Figure 5:
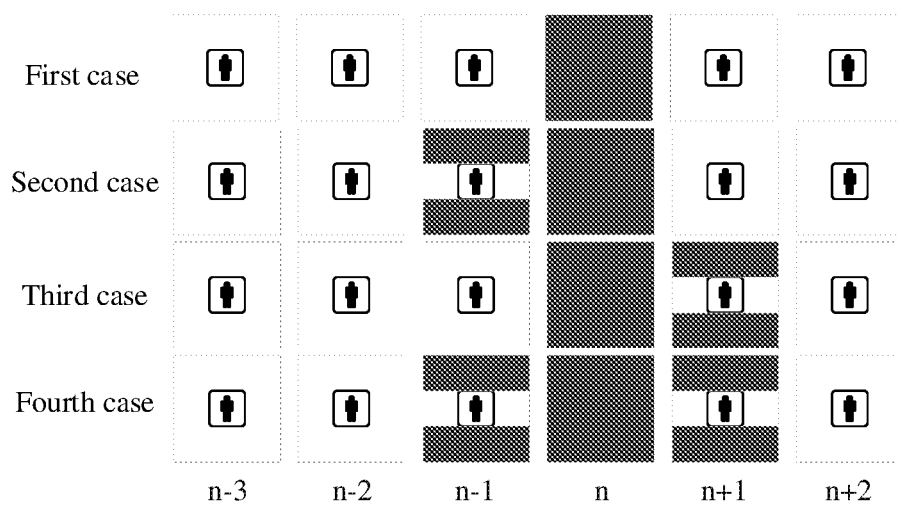
FIG. 5 shows four black screen cases according to an embodiment of the present invention.

As shown in FIG. 5, due to the continuous closing of the mechanical shutter, the black screen case mainly includes the following four cases:

First case: One frame of full back screen image appears in several consecutive frames of second image.

Second case: One frame of image with symmetrical black bars appears in several consecutive frames of second image, and a subsequent frame of image with symmetrical black bars is the full back screen image.

Third case: One frame of image with symmetrical black bars appears in several consecutive frames of second image, and a previous frame of image with symmetrical black bars is the full back screen image;

Fourth case: One frame of image with symmetrical black bars appears in several consecutive frames of second image, and a subsequent frame of image with symmetrical black bars is the full back screen image. The subsequent frame of full back screen image is the image with symmetrical black bars.

Due to a very fast closing speed of the mechanical shutter, generally, an entire shutter action is completed within about 50 ms, and the closing and opening of the mechanical shutter is completed with a shorter time within 5 ms. Therefore, when a frame rate is 60 frames per second (fps), the first case in FIG. 5 shows that the full back screen image appears most frequently when the mechanical shutter closes, the second case and the third case show that an appearance probability is very low, and the fourth case hardly appears. In addition, an appearance probability that consecutive two frames of images are the images with symmetrical black bars is substantially zero in an actual situation. When the frame rate is 30 fps, the second case and the third case rarely appear.

Therefore, to avoid the black screen case, each frame of second image may be detected, to determine whether the full back screen image and the image with symmetrical black bars exists, so as to prevent the full back screen image or the image with symmetrical black bars from being transmitted to the image receiving terminal, affecting the visual effect.

In some implementations, whether the second image is the full back screen image or the image with symmetrical black bars may be determined according to the image grayscale values of the pixels of the detected image, that is, the second image, and when the foregoing four cases appear, the full back screen image or the image with symmetrical black bars is discarded, to avoid the black screen case.

Specifically, whether the second image is the full back screen image or the image with symmetrical black bars may be determined by counting the quantity of pixels that meet the preset condition in the preset region of the second image. The preset condition is that the image grayscale value of a pixel is less than the preset grayscale threshold.

For the full back screen image or the image with symmetrical black bars, different determining strategies may be adopted to perform determination. Because the full back screen image is for the entire region of the second image, statistics and determination may be performed based on image grayscale values of pixels of the entire region of the second image. Because the image with symmetrical black bars is for the partial region of the second image, statistics and determination may be performed based on image grayscale values of pixels of the partial region of the second image.

Specifically, the fall back screen image is a second image with the quantity being greater than a first preset quantity threshold when the preset region is the entire region of the second image. The first preset quantity threshold is determined by a size and a first preset dead pixel tolerance quantity of the second image.

The image with symmetrical black bars is a second image with the quantity being greater than a second preset quantity threshold when the preset region is the partial region of the second image. The partial region includes a first region and a second region, the first region and the second region are symmetrically distributed, and the second preset quantity threshold is determined by sizes and second preset dead pixel tolerance quantities of the first region and the second region.

Figures 6A, 6B:
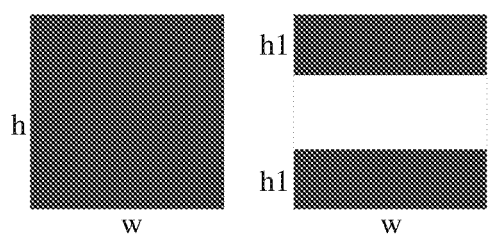
FIG. 6(a) is a schematic diagram of a full back screen image according to an embodiment of the present invention.
FIG. 6(b) is a schematic diagram of an image with symmetrical black bars according to an embodiment of the present invention.

The following separately describes the determination of the full back screen image and the image with symmetrical black bars in detail with reference to FIG. 6(a) and FIG. 6(b).

For statistics on the quantity corresponding to the full back screen image and the determination of the full back screen image, as shown in FIG. 6(a), it is assumed that a size of the second image is w*h, where a width of the second image is w, and a height of the second image is h; a quantity of image grayscale values of pixels being less than the preset grayscale threshold are m, and at an initial stage, m=0; and an image grayscale value of a pixel in an $i^{th}$ row and a $j^{th}$ column of the second image is $Y_{(i,j)}$, where i is 0~(w−1), and j is 0~(h−1).

The counting a quantity of image grayscale values of pixels in the entire region of the second image being less than the preset grayscale threshold of the pixels, to determine whether the second image is the full back screen image, is specifically as follows:

$i=0\sim(w-1), j=0\sim(h-1)$

When $Y_{(i,j)}<T$, $m=m+1$

When $m>M1=w\times h-B1$, it indicates that the second image is the full back screen image T is the preset grayscale threshold. The preset grayscale threshold is used for defining a gray level of the pixel. The preset grayscale threshold may be preconfigured in the image processing module, or the preset grayscale threshold may be adjusted as required. For example, according to historical empirical data, the preset grayscale threshold T may be 25.

M1 is the first preset quantity threshold. The first preset quantity threshold is used for defining whether the second image is the full back screen image. That is, when m>M1, it indicates that the second image is the full back screen image. When m≤M1, it indicates that the second image is not the full back screen image. The first preset quantity threshold M1 is determined by the size and the first preset dead pixel tolerance quantity of the second image. That is, M1=w×h−B1.

B1 is the first preset dead pixel tolerance quantity. For an image, when requirements are not particularly high, a default standard in the industry is followed for a "dead pixel" in the image. The "dead pixel" is a "normal" phenomenon as long as the quantity is not too many. In a specific case, the dead pixel is tolerable. Therefore, to be prudent, when the expected effect of the image is met, a certain quantity of "dead pixels" are tolerable. The first preset dead pixel tolerance quantity is used for defining a maximum quantity of "dead pixels" that are tolerable. The first preset dead pixel tolerance quantity may be preconfigured in the image processing module, or the preset grayscale threshold may be adjusted as required. For example, the first preset dead pixel tolerance quantity may be 8.

Because several levels are obtained through division between white and black generally according to a logarithmic relationship, a range is generally from 0 to 255, where white is 255 and black is 0. A smaller image grayscale value indicates a darker color. That is, the color is closer to black. Therefore, when an image grayscale value of a certain pixel is less than the preset grayscale threshold, it may be considered the pixel is close to black. In this case, the quantity of image grayscale values of pixels being less than the preset grayscale threshold is increased by one. That is, when $Y_{(i,j)}<T$, m=m+1. In addition, when the quantity of image grayscale values of pixels being less than the preset grayscale threshold m>M1 is counted, it indicates that the second image is the full back screen image.

For statistics on the quantity corresponding to the image with symmetrical black bars and the determination of the image with symmetrical black bars, as shown in FIG. 6(b), it is assumed that a size of the second image is w*h, where a width of the second image is w, and a height of the second image is h; a quantity of image grayscale values of pixels being less than the preset grayscale threshold are m, and at an initial stage, m=0; sizes of both the first region and the second region are w*h1, where widths of the first region and the second region are w, heights of the first region and the second region are h1, and the first region and the second region are symmetrically distributed on upper and lower sides of the second image; and an image grayscale value of a pixel in an $i^{th}$ row and a $j^{th}$ column of the second image is $Y_{(i,j)}$, where i is 0~(w−1), and j is between 0~(h1−1) and (h−h1)~(h−1).

The counting a quantity of image grayscale values of pixels in the partial region of the second image being less than the preset grayscale threshold of the pixels, to determine whether the second image is the image with symmetrical black bars, is specifically as follows:

$i=0\sim(w-1), j=0\sim(h1-1)$ and $j=(h-h1)\sim(h-1)$

When $Y_{(i,j)}<T$, $m=m+1$

If $m>M2=w\times h1\times 2-B2$, it indicates that the second image is the image with symmetrical black bars T is the preset grayscale; threshold. M2 is the second preset quantity threshold. The second preset quantity threshold is used for defining whether the second image is the image with symmetrical black bars. That is, when m>M2, it indicates that the second image is the image with symmetrical black bars. When m≤M2, it indicates that the second image is not the image with symmetrical black bars. The second preset quantity threshold M2 is determined by the sizes and the second preset dead pixel tolerance quantities of the first region and the second region. That is, M2=w×h1×2−B2.

B2 is the second preset dead pixel tolerance quantity. The second preset dead pixel tolerance quantity is similar to the first preset dead pixel tolerance quantity. Therefore, details are not described herein. The second preset dead pixel tolerance quantity may also be 8.

h1 is the height of the first region or the second region. The height may be preconfigured in the image processing module, and may be adjusted as required. In addition, according to an actual situation, h1 cannot be too small. Due to too small h1, even if both grayscale values of the pixel points of the first region and the second region are preset grayscale thresholds, that is, both colors of the images in the first region and the second region are close to black, the overall effect on the second image is not large due to the relatively small first region and second region, and the visual effect of the user is also not affected. In this case, it is not suitable for discarding the image. Therefore, h1 cannot be too small. For example, h1 may be greater than 10.

Because several levels are obtained through division between white and black generally according to a logarithmic relationship, a range is generally from 0 to 255, where white is 255 and black is 0. A smaller image grayscale, value indicates a darker color. That is, the color is closer to black. Therefore, when an image grayscale value of a certain pixel is less than the preset grayscale threshold, it may be considered the pixel is close to black. In this case, the quantity of image grayscale values of pixels being less than the preset grayscale threshold is increased by one. That is, when $Y_{(i,j)}<T$, m=m+1. In addition, when the quantity of image grayscale values of pixels being less than the preset grayscale threshold m>M2 is counted, it indicates that the second image is the image with symmetrical black bars.

407. Detect whether the quantity falls within a preset range.

Whether the quantity falls within the preset range is detected, to determine whether the second image is the full back screen image or the image with symmetrical black bars, thereby improving the visual effect of the user.

For the case that the second image is not the full back screen image, the preset range is less than or equal to the first preset quantity threshold. That is, when m≤M1, the second image is not the full back screen image. For the case that the second image is not the image with symmetrical black bars, the preset range is less than or equal to the second preset quantity threshold. That is, when m≤M2 the second image is not the image with symmetrical black bars.

408. Encode the second image to obtain encoded video image frames.

Based on step 407, the encoding the second image to obtain encoded video image frames includes: encoding the second image with the quantity being within the preset range to obtain the encoded video image frames.

409. Transmit the encoded video image frames to the display apparatus.

410. Discard the second image with the quantity being not within the preset range.

The discarding the second image with the quantity being not within the preset range includes: discarding a full back screen image (an $n^{th}$ frame of image in the first case, the second case, the third case or the fourth case in FIG. 5); and discarding, when an adjacent frame image of an image with symmetrical black bars is a full back screen image, the image with symmetrical black bars (an $(n-1)^{th}$ frame of image in the second case, an $(n+1)^{th}$ frame image in the third case and an $(n-1)^{th}$ frame of image and an $(n+1)^{th}$ frame of image in the fourth case in FIG. 5).

The image receiving terminal may be prevented from receiving the image affecting the visual effect by discarding the second image with the quantity being not within the preset range, for example, the full back screen image or the image with symmetrical black bars, thereby improving the user experience.

It can be understood that, in some embodiments, steps 402 and/or step 403 may not be mandatory steps/a mandatory step in different embodiments; in addition, according to the description in this embodiment of the present invention, it can be understood that step 401 to step 410 may be performed in a different sequence in different embodiments when no conflict occurs. For example, step 410 is first performed, and step 409 is then performed.

It should be further noted that, for technical details that are not specifically described in step 401 to step 410 in this embodiment of the present invention, reference may be made to the specific description in the foregoing embodiment.

In this embodiment of the present invention, an acquired original image is first converted into a first image conforming to a format of an audio/video interface, the first image is then converted into a second image conforming to a format of an interface of a display apparatus, the second image is encoded to obtain encoded video image frames, and the encoded video image frames are finally transmitted to a display apparatus, thereby achieving real-time image transmission, allowing a user to view the acquired image in real time.

In addition, in this embodiment of the present invention, a second image that is a full back screen image or an image with symmetrical black bars is discarded by further detecting whether a quantity of pixels that meet a preset condition in a preset region of the second image falls within the preset range, thereby optimizing the visual effect of the image received by the image receiving terminal.

Embodiment 3

Figure 7:
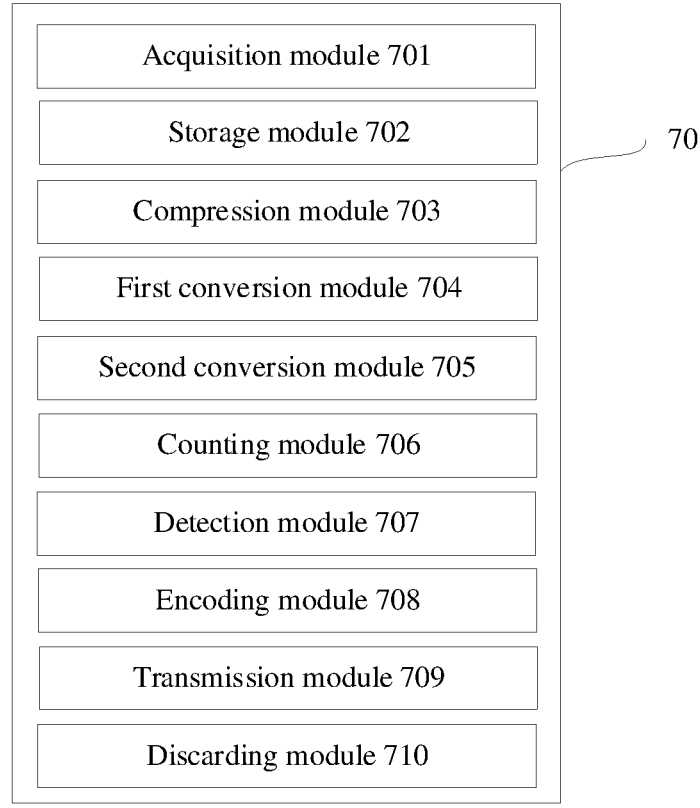
FIG. 7 is a schematic diagram of an image transmission apparatus according to an embodiment of the present invention.

FIG. 7 is a schematic diagram of an image transmission apparatus according to an embodiment of the present invention. The image transmission apparatus 70 may be disposed in the foregoing UAV.

Referring to FIG. 7, the image transmission apparatus 70 includes: an acquisition module 701, a storage module 702, a compression module 703, a first conversion module 704, a second conversion module 705, a counting module 706, a detection module 707, an encoding module 708, a transmission module 709 and a discarding module 710.

Specifically, the acquisition module 701 is configured to acquire an original image.

The acquisition module 701 may be connected to the image acquisition apparatus. During the flight of the UAV, the acquisition module 701 may acquire the original image by using the image acquisition apparatus, to acquire the original image. The image acquisition apparatus may be an image acquisition device such as a camera and a video camera. In addition, to improve the quality of the acquired original image, a camera with a larger image sensor size, for example, a full-frame camera or a medium format camera, may be adopted, to obtain an original image with higher image quality such as a full-frame image or medium format image.

Specifically, the storage module 702 is configured to store the original image into a storage space.

To subsequently invoke the original image when the original image is needed, the storage module 702 may store the original image acquired by the acquisition module 701 in the built-in or external storage space of the UAV. For example, the UAV is provided with an external SD card interface, and a memory device such as an SD card may be inserted into the interface, to store the acquired original image. In addition, several frames of consecutive original images form a video. In some examples, the storage module 702 may alternatively store the video formed by the several frames of consecutive original images in the built-in or external storage space of the UAV.

The compression module 703 is configured to compress the original image according to a preset ratio, to obtain a compressed image.

Generally, to ensure the quality of the image, a resolution of the original image is generally relatively high. For example, the original image may be at a resolution of 40 million pixels, and it is not convenient for such an image at a high resolution to implement real-time image transmission. After the acquisition module 701 acquires the original image, the compression module 703 may compress the original image according to the preset ratio, to facilitate subsequent image transmission.

The first conversion module 704 is configured to convert the original image into a first image, the first image being an image conforming to a format of an audio/video interface.

After the compression module 703 compresses the original image, the first conversion module 704 may convert the compressed image into the first image, to facilitate an output of the compressed image. For example, the first conversion module 704 converts the compressed image is converted into the image conforming to the format of an audio/video interface, to facilitate in outputting to the second conversion module 705 for subsequent processing.

The audio/video interface includes, but not limited to, one or more of the following: a High-Definition Multimedia Interface (HDMI) interface, a Video Graphics Array (VGA) interface, a Digital Visual Interface (DVI), and a Display-Port (DP) interface.

Because the first image is the image conforming to the format of an audio/video interface, the first image is outputted through the audio/video interface such as the HDMI, the VGA interface, the DVI or the DP interface after the compressed image is converted into the first image by using the first conversion module 704.

In some embodiments, because the several frames of consecutive images may form a video, the first conversion module 704 may alternatively convert the compressed video into a video conforming to the format of an audio/video interface, and the video conforming to the format of an audio/video interface is outputted through the audio/video interface such as the HDMI, the VGA interface, the DVI or the DP interface, to facilitate in transmitting the video in real time.

The second conversion module 705 is configured to convert the first image into a second image, the second image being an image conforming to a format of an interface of a display apparatus.

Generally, because the image receiving terminal cannot directly receive the image outputted through the audio/video interface such as the HDMI, the VGA interface, the DVI or the DP interface, to transmit the image in real time, the first image needs to be converted into the second image by using the second conversion module 705, so that the image receiving terminal may receive the processed image.

The interface of the display apparatus includes, but not limited to, one or more of the following: a BT1120 interface, a BT656 interface, and a BT709 interface. For example, the second conversion module 705 may convert an image conforming to an HDMI format into an image conforming to a BT1120 format.

The counting module 706 is configured to count a quantity of pixels that meet a preset condition in a preset region of the second image.

The partial region of the second image may be an entire region of the second image, or may be a partial region of the second image. The preset condition is that an image grayscale value of a pixel is less than a preset grayscale threshold.

Generally, the image acquisition apparatus is provided with a mechanical shutter. Each time an original image is acquired, the mechanical shutter closes once. In the process of acquiring the original image by the image acquisition apparatus, due to continuous closing of the mechanical shutter, a black screen case of the acquired original image is caused. Because the second image is converted from the first image, and the first image is converted from the original image, a black screen case may also occur in the second image, resulting: in a case that a black screen image exists in the image transmitted to the display apparatus, thereby affecting the visual effect of the user.

Therefore, to improve the visual effect of the user and avoid the black screen case, the black screen case needs to be processed before the encoding module 708 encodes the second image to obtain the encoded video image frames. For example, the counting module 706 may be configured to count a quantity of pixels that meet a preset condition in a preset region of the second image, to determine, based on the quantity, whether a full back screen image or an image with symmetrical black bars exists. If the full back screen image or the image with symmetrical black bars exists, the full back screen image or the image with symmetrical black bars is discarded, to prevent the full back screen image or the image with symmetrical black bars from being transmitted to the image receiving terminal, thereby affecting the visual effect.

The preset condition is that an image grayscale value of a pixel is less than a preset grayscale threshold.

For the full back screen image or the image with symmetrical black bars, the counting module 706 may adopt different counting strategies to count, Because the full back screen image is for the entire region of the second image, the counting module 706 may perform statistics based on image grayscale values of pixels of the entire region of the second image. Because the image with symmetrical black bars is for the partial region of the second image, the counting module 706 may perform statistics based on image grayscale values of pixels of the partial region of the second image.

For statistics on the quantity corresponding to the full back screen image, as shown in FIG. 6(a), it is assumed that a size of the second image is w*h, where a width of the second image is w, and a height of the second image is h; a quantity of image grayscale values of pixels being less than the preset grayscale threshold are m, at an initial stage, m=0;

and an image grayscale value in an $i^{th}$ row and a $j^{th}$ column of the second image is $Y_{(i,j)}$, where i is 0~(w−1), and j is 0~(h−1).

The counting a quantity of image grayscale values of pixels in the entire region of the second image being less than the preset grayscale threshold of the pixels is specifically as follows:

$$i=0\sim(w-1), j=0\sim(h-1)$$

When $Y_{(i,j)} < T$, $m = m+1$

T is the preset grayscale threshold. The preset grayscale threshold is used for defining the gray level of the pixel. The preset grayscale threshold may be preconfigured in the image processing module, or the preset grayscale threshold may be adjusted as required. For example, according to historical empirical data, the preset grayscale threshold T may be 25.

Because several levels are obtained through division between white and black generally according to a logarithmic relationship, a range is generally from 0 to 255, where white is 255 and black is 0. A smaller image grayscale value indicates a darker color. That is, the color is closer to black. Therefore, when an image grayscale value of a certain pixel is less than the preset grayscale threshold, it may be considered the pixel is close to black, h1 this case, the quantity of image grayscale values of pixels being less than the preset grayscale threshold is increased by one. That is, when $Y_{(i,j)} < T$, $m = m+1$.

For statistics on the quantity corresponding to the image with symmetrical black bars, as shown in FIG. 6(b), it is assumed that a size of the second image is w*h, where a width of the second image is w, and a height of the second image is h; a quantity of image grayscale values of pixels being less than the preset grayscale threshold are m, and at an initial stage, m=0; sizes of both the first region and the second region are w*h1, where widths of the first region and the second region are w, heights of the first region and the second region are h1, and the first region and the second region are symmetrically distributed on upper and lower sides of the second image; and an image grayscale value of a pixel in an $i^{th}$ row and a $j^{th}$ column of the second image is $Y_{(i,j)}$, where i is 0~(w−1), and j is between 0~(h1−1) and (h−h1)~(h−1).

The counting a quantity of image grayscale values of pixels in the partial region of the second image being less than the preset grayscale threshold of the pixels is specifically as follows:

$$i=0\sim(w-1), j=0\sim(h1-1) \text{ and } j=(h-h1)\sim(h-1)$$

When $Y_{(i,j)} < T$, $m = m+1$

T is the preset grayscale threshold. h1 is the height of the first region or the second region. The height may be preconfigured in the image processing module, and may be adjusted as required. In addition, according to an actual situation, h1 cannot be too small. Due to too small h1, even if both grayscale values of the pixel points of the first region and the second region are preset grayscale thresholds, that is, both colors of the images in the first region and the second region are close to black, the overall effect on the second image is not large due to the relatively small first region and second region, and the visual effect of the user is also not affected. In this case, it is not suitable for discarding the image. Therefore, h1 cannot be too small. For example, h1 may be greater than 10.

Because several levels are obtained through division between white and black generally according to a logarithmic relationship, a range is generally from 0 to 255, Where White is 255 and black is 0. A smaller image grayscale value indicates a darker color. That is, the color is closer to black. Therefore, when an image grayscale value of a certain pixel is less than the preset grayscale threshold, it may be considered the pixel is close to black. In this case, the quantity of image grayscale values of pixels being less than the preset grayscale threshold is increased by one. That is, when $Y_{(i,j)} < T$, $m = m+1$.

The detection module 707 is configured to detect whether the quantity falls within the preset range.

The detection module 707 may detect whether the quantity fans within the preset range, to determine whether the second image is the full back screen image or the image with symmetrical black bars, thereby improving the visual effect of the user.

For the case that the second image is not the full back screen image, the preset range is less than or equal to the first preset quantity threshold. That is, when m≤M1, the second image is not the full back screen image, M1 being the first preset quantity threshold. For the case that the second image is not the image with symmetrical black bars, the preset range is less than or equal to the second preset quantity threshold. That is, when m≤M2, the second image is not the image with symmetrical black bars, M2 being the second preset quantity threshold.

M1 is the first preset quantity threshold. The first preset quantity threshold is used for defining whether the second image is the full back screen image. That is, when m>M1, it indicates that the second image is the full back screen image. When m≤M1, it indicates that the second image is not the full back screen image. The first preset quantity threshold M1 is determined by the size and the first preset dead pixel tolerance quantity of the second image. That is, M1=w×h−B1, B1 is a first preset dead pixel tolerance quantity.

M2 is the second preset quantity threshold. The second preset quantity threshold is used for defining whether the second image is the image with symmetrical black bars. That is, when m>M2, it indicates that the second image is the image with symmetrical black bars. When m≤M2, it indicates that the second image is not the image with symmetrical black bars. The second preset quantity threshold M2 is determined by the sizes and the second preset dead pixel tolerance quantities of the first region and the second region. That is, M2=w×h1×2−B2. B2 is the second preset dead pixel tolerance quantity.

The encoding module 708 is configured to encode the second image to obtain encoded video image frames.

To improve the visual effect of the user, avoid the black screen case, and prevent the full back screen image or the image with symmetrical black bars from being transmitted to the image receiving terminal, the image encoded by the encoding module 708 should be the second image with the quantity being within the preset range. That is, the encoding module 708 is specifically configured to encode the second image with the quantity being within the preset range to obtain the encoded video image frames.

A coding standard may be a DivX, XviD, AVC, H.263, H.264, H.265, or Windows Madia Video standard.

The transmission module 709 is configured to transmit the encodedvideo image frames to the display apparatus.

The image encoded by the encoding module 708 may be transmitted to the image receiving terminal by using the image transmission module 709, thereby achieving real-time image transmission. In addition, after the image receiving terminal receives the encoded video image frames, the image receiving terminal may decode the received image by using the decoder, and the decoded image is displayed on a display screen of the image receiving terminal, so that the user may know the acquired image in real time. Therefore, during the flight of the UAV, if cases such as the acquired original image is overexposed, too dark, or in the field of view are encountered, the acquired original image can be adjusted in time, so that the effect of the acquired original image meets an expected effect.

The discarding module 710 is configured to discard the second image with the quantity being not within the preset range.

The discarding module 710 is specifically configured to: discard a full back screen image (an $n^{th}$ frame of image in the first case, the second case, the third case or the fourth case in FIG. 5); and discard, when an adjacent frame image of an image with symmetrical black bars is a full back screen image, the image with symmetrical black bars (an $(n-1)^{th}$ frame of image in the second case, an $(n+1)^{th}$ frame image in the third case and an $(n-1)^{th}$ frame of image and an $(n+1)^{th}$ frame of image in the fourth ease in FIG. 5).

The full back screen image is a second image with the quantity being greater than a first preset quantity threshold when the preset region is the entire region of the second image. The first preset quantity threshold is determined by the size and the first preset dead pixel tolerance quantity of the second image. That is, if $m > M1 = w \times h - B1$ it indicates that the second image is the full back screen image M1 is the first preset quantity threshold. The first preset quantity threshold is used for defining whether the second image is the full back screen image. B1 is the first preset dead pixel tolerance quantity.

The image with symmetrical black bars is a second image with the quantity being greater than the second preset quantity threshold when the preset region is the partial region of the second image. The partial region includes a first region and a second region, the first region and the second region are symmetrically distributed, and the second preset quantity threshold is determined by the sizes and the second preset dead pixel tolerance quantities of the first region and the second region. That is, if $m > M2 = w \times h1 \times 2 - B2$, it indicates that the second image is the image with symmetrical black bars M2 is the second preset quantity threshold. The second preset quantity threshold is used for defining whether the second image is the image with symmetrical black bars. B2 is the second preset dead pixel tolerance quantity.

The image receiving terminal may be prevented from receiving the image affecting the visual effect by discarding, by the discarding module 710, the second image with the quantity being not within the preset range, thereby improving the user experience.

It should be noted that, in some embodiments, the storage module 702 and/or the compression module 703 may not be necessary modules/a necessary module of the image transmission apparatus 70 in different embodiments. That is, in some embodiments, the storage module 702 and/or the compression module 703 may be omitted.

It should be further noted that, in this embodiment of the present invention, the image transmission apparatus 70 may perform the image transmission method provided in any, method embodiment, and the corresponding functional modules for performing the method and beneficial effects thereof are provided. For technical details not described in detail in this embodiment of the image transmission apparatus 70, reference may be made to the image transmission method provided in the method embodiments.

Embodiment 4

Figure 8:
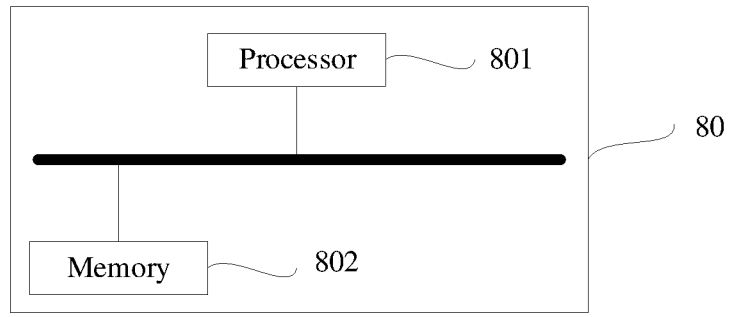
FIG. 8 is a schematic structural diagram of hardware of an image transmitting terminal according to an embodiment of the present invention.

FIG. 8 is a schematic structural diagram of hardware of an image transmitting terminal according to an embodiment of the present invention. The image transmitting terminal may be a camera assembly of the foregoing UAV 100, an unmanned spacecraft or the like. As shown in FIG. 8, the image transmitting terminal 80 includes:

one or more processors 801 and a memory 802. One processor 801 is used as an example in FIG. 8.

The processor 801 and the memory 802 may be connected by using a bus or in another manner. A connection by using the bus is used as an example in FIG. 8.

The memory 802, as a non-volatile computer-readable storage medium, may be configured to store a non-volatile software program, a non-volatile computer-executable program and a module, for example, a program instruction/module (for example, the acquisition module 701, the storage module 702, the compression module 703, the first conversion module 704, the second conversion module 705, the counting module 706, the detection module 707, the encoding module 708, the transmission module 709 and the discarding module 710 shown in FIG. 7) corresponding to the image transmission method provided in this embodiment of the present invention. The processor 801 performs various functional applications and data processing of the image transmitting terminal by running the non-volatile software program, instructions and module stored in the memory 802, that is, implementing the image transmission method provided in the foregoing method embodiments.

The memory 802 may include a program storage area and a data storage area. The program storage area may store an operating system, an application program required by at least one function and the like. The data storage area may store data created according to use of the image transmitting terminal or the like. In addition, the memory 802 may include a high speed random access memory, and may also include a non-volatile memory, such as at least one magnetic disk storage device, a flash memory, or another volatile solid-state storage device. In some embodiments, the memory 802 may optionally include memories remotely, disposed relative to the processor 801, and the remote memories may be connected to the image transmitting terminal through a network. Examples of the network include, but not limited to, the Internet, an intranet, a local area network, a mobile communications network and a combination thereof.

The one or more modules are stored in the memory 802, and when being executed by one or more processors 801, perform the image transmission method provided in this embodiment of the present invention, for example, perform the foregoing method step 401 to step 410 described in FIG. 4, or implement the functions of the modules 701 to 710 in FIG. 7.

Exemplarily, the image transmitting terminal may further include a communications interface. The communications interface is configured to communicate with another device such as a server. The image transmitting terminal includes other apparatuses, which are not be limited herein.

For the image transmitting terminal, the image transmission method provided in this embodiment of the present application may be performed, and the corresponding functional modules for performing the method and beneficial effects thereof are provided. For technical details not described in detail in this embodiment of the image transmitting terminal, reference may be made to the image transmission method provided in this embodiment of the present invention.

The embodiments of the present invention further provide a computer program product, including a computer program stored in a non-volatile computer-readable storage medium, the computer program including program instructions, the program instructions, when executed by a computer, causing the computer to perform the image transmission method provided in this embodiment of the present invention. For example, the foregoing method step 401 to step 410 described in FIG. 4 are performed, or the functions of the modules 701 to 710 in FIG. 7 are implemented.

The embodiments of the present invention provide a non-volatile computer-readable storage medium, the computer-readable storage medium storing computer executable instructions, the computer executable instructions being configured to cause a computer to perform the image transmission method provided in this embodiment of the present invention. For example, the foregoing method step 401 to step 410 described in FIG. 4 are performed, or the functions of the modules 701 to 710 in FIG. 7 are implemented.

Embodiment 5

Figure 9:
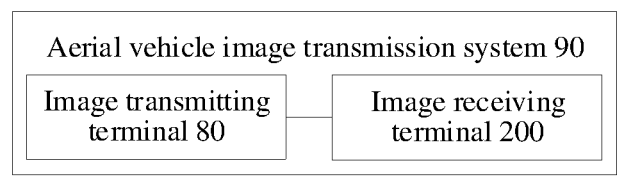
FIG. 9 is a schematic diagram of an aerial vehicle image transmission system according to an embodiment of the present invention.

FIG. 9 is a schematic diagram of an aerial vehicle image transmission system according to an embodiment of the present invention. The aerial vehicle image transmission system 90 includes the image transmitting terminal 80 and the image receiving terminal 200 described above. The image transmitting terminal 80 is communicatively connected to the image receiving terminal 200. The image transmitting terminal 80 may transmit the acquired original image in real time after being processed to the image receiving terminal 200, thereby achieving real-time image transmission. In addition, in this embodiment of the present invention, a second image that is a full back screen image or an image with symmetrical black bars is discarded by detecting, by the image transmitting terminal 80, whether a quantity of pixels that meet a preset condition in a preset region of the second image falls within the preset range, thereby optimizing the visual effect of the image received by the image receiving terminal 200.

It should be noted that, the foregoing described apparatus embodiment is merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the embodiments may be implemented by a computer program instructing relevant hardware. The program may be stored in a computer-readable storage medium. During execution of the program, the processes of the method embodiments may be performed. The storage medium may be a magnetic disk, an optical disc, a read-only memory (ROM), a RAM or the like.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for video data transmission, comprising:
   acquiring an original image;
   converting the original image into a first image, the first image being an image conforming to a format of an audio/video interface;
   converting the first image into a second image, the second image being an image conforming to a format of an interface of a display apparatus;
   counting a quantity of pixels that meet a preset condition in a preset region of the second image; and
   detecting whether the quantity falls within a preset range;
   encoding the second image with the quantity being within the preset range to obtain the encoded video image frames; and
   transmitting the encoded video image frames to the display apparatus.

2. The method according to claim 1, wherein the preset condition is that an image grayscale value of a pixel is less than a preset grayscale threshold.

3. The method according to claim 2, further comprising:
   discarding the second image with the quantity being not within the preset range.

4. The method according to claim 3, wherein the discarding a second image with the quantity is not within the preset range comprises;
   discarding a full back screen image, the full back screen image being a second image with the quantity being greater than a first preset quantity threshold when the preset region is an entire region of the second image, the first preset quantity threshold being determined by a size and a first preset dead pixel tolerance quantity of the second image.

5. The method according to claim 4, wherein the discarding the second image with the quantity being not within the preset range further comprises:
   discarding, when an adjacent frame image of an image with symmetrical black bars is a full back screen image, the image with symmetrical black bars, the image with symmetrical black bars being a second image with the quantity being greater than a second preset quantity threshold when the preset region is a partial region of the second image,
   the partial region comprising a first region and a second region, the first region and the second region being symmetrically distributed, and the second preset quantity threshold being determined by sizes and second preset dead pixel tolerance quantities of the first region and the second region.

6. The method according to claim 1, wherein before the converting the original image into a first image, the method further comprises:
compressing the original image according to a preset ratio, to obtain a compressed image; and
the converting the original image into a first image comprises:
converting the compressed image into the first image.

7. The method according to claim 1, further comprising:
storing the original image.

8. The method according to claim 1, wherein the audio/video interface comprises one or more of the following: a High-Definition Multimedia Interface (HDMI) interface, a Video Graphics Array (VGA) interface, a Digital Visual Interface (DVI), and a DisplayPort (DP) interface.

9. The method according to claim 1, wherein the interface of the display apparatus comprises one or more of the following: a BT1120 interface, a BT656 interface, and a BT709 interface.

10. A photographing apparatus comprising:
a camera;
a processor coupled to the camera and configured to:
control the camera to acquire an original image;
convert the original image into a first image, the first image being an image conforming to a format of an audio/video interface;
convert the first image into a second image, the second image being an image conforming to a format of an interface of a display apparatus;
count a quantity of pixels that meet a preset condition in a preset region of the second image; and
detect whether the quantity falls within a preset range; and
encode the second image with the quantity being within the preset range to obtain the encoded video image frames; and
a transmitter coupled to the processor and configured to transmit the encoded video image frames to the display apparatus.

11. The photographing apparatus according to claim 10, wherein the processor is further configured to:
the preset condition is that an image grayscale value of a pixel is less than a preset grayscale threshold.

12. The photographing apparatus according to claim 11, wherein the processor is further configured to:
discard the second image with the quantity being not within the preset range.

13. The photographing apparatus according to claim 12, wherein the processor is further configured to:
discard a full back screen image, the full back screen image being a second image with the quantity being greater than a first preset quantity threshold when the preset region is an entire region of the second image, the first preset quantity threshold being determined by a size and a first preset dead pixel tolerance quantity of the second image.

14. The photographing apparatus according to claim 13, wherein the processor is further configured to:
discard, when an adjacent frame image of an image with symmetrical black bars is a full back screen image, the image with symmetrical black bars, the image with symmetrical black bars being a second image with the quantity being greater than a second preset quantity threshold when the preset region is a partial region of the second image,
the partial region comprising a first region and a second region, the first region and the second region being symmetrically distributed, and the second preset quantity threshold being determined by sizes and second preset dead pixel tolerance quantities of the first region and the second region.

15. The photographing apparatus according to claim 10, wherein the processor is further configured to:
compressing the original image according to a preset ratio, to obtain a compressed image; and
the convert the original image into a first image comprises:
convert the compressed image into the first image.

16. The photographing apparatus according to claim 10, wherein the processor is further configured to:
store the original image.

17. The photographing apparatus according to claim 10, wherein the processor is further configured to:
the audio/video interface comprises one or more of the following: a High-Definition Multimedia Interface (HDMI) interface, a Video Graphics Array (VGA) interface, a Digital Visual Interface (DVI), and a DisplayPort (DP) interface.

18. The photographing apparatus according to claim 10, wherein the processor is further configured to:
the interface of the display apparatus comprises one or more of the following: a BT1120 interface, a BT656 interface, and a BT709 interface.

19. A device for video data transmission comprising:
a photographing apparatus;
and a display apparatus configured to receive and display a video transmitted from the photographing apparatus;
wherein the photographing apparatus includes:
a camera;
a processor coupled to the camera and configured to:
control the camera to acquire an original image;
convert the original image into a first image, the first image being an image conforming to a format of an audio/video interface;
convert the first image into a second image, the second image being an image conforming to a format of an interface of a display apparatus;
count a quantity of pixels that meet a preset condition in a preset region of the second image;
detect whether the quantity falls within a preset range; and
encode the second image with the quantity being within the preset range to obtain the encoded video image frames; and
a transmitter coupled to the processor and configured to transmit the encoded video image frames to the display apparatus.

20. The device for video data transmission according to claim 19, wherein the processor is further configured to:
the preset condition is that an image grayscale value of a pixel is less than a preset grayscale threshold.

21. The device for video data transmission according to claim 20, wherein the processor is further configured to:
discard the second image with the quantity being not within the preset range.

22. The device for video data transmission according to claim 21, wherein the processor is further configured to:
discard a full back screen image, the full back screen image being a second image with the quantity being greater than a first preset quantity threshold when the preset region is an entire region of the second image, the first preset quantity threshold being determined by a size and a first preset dead pixel tolerance quantity of the second image.

23. The device for video data transmission according to claim 21, wherein the processor is further configured to:

discard, when an adjacent frame image of an image with symmetrical black bars is a full back screen image, the image with symmetrical black bars, the image with symmetrical black bars being a second image with the quantity being greater than a second preset quantity threshold when the preset region is a partial region of the second image, the partial region comprising a first region and a second region, the first region and the second region being symmetrically distributed, and the second preset quantity threshold being determined by sizes and second preset dead pixel tolerance quantities of the first region and the second region.

24. The device for video data transmission according to claim 19, wherein the processor is further configured to:

compressing the original image according to a preset ratio, to obtain a compressed image; and the convert the original image into a first image comprises:

convert the compressed image into the first image.

25. The device for video data transmission according to claim 19, wherein the processor is further configured to:

store the original image.

\* \* \* \* \*